Sept. 13, 1938.  W. H. NOELTING  2,130,245
DRIVE-ON SOCKET FOR CASTERS OR THE LIKE
Filed Aug. 7, 1937
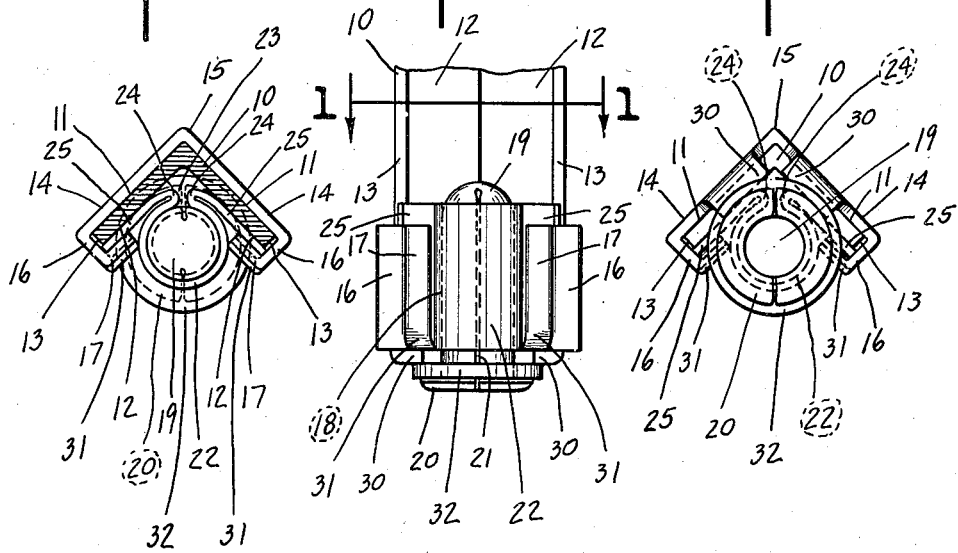
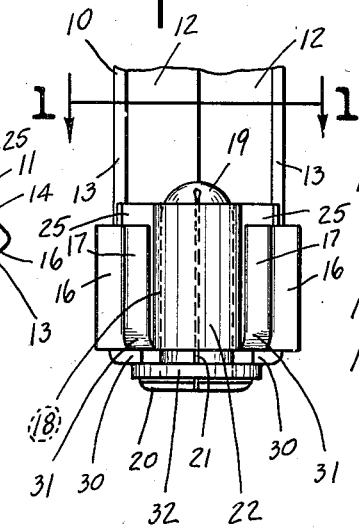
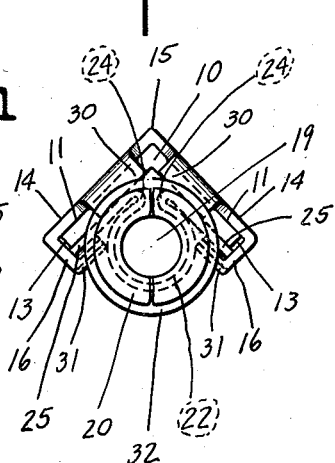
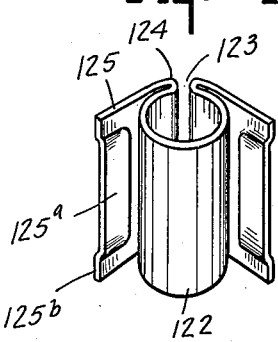
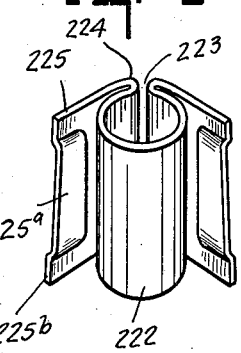
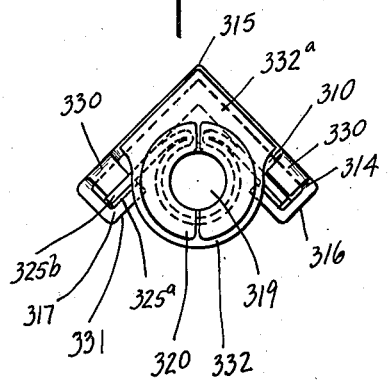
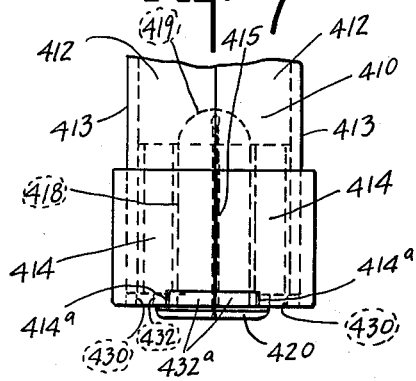
INVENTOR.
WILLIAM H. NOELTING.
BY Lockwood Goldsmith & Galt
ATTORNEYS.

Patented Sept. 13, 1938

2,130,245

UNITED STATES PATENT OFFICE 2,130,245

DRIVE-ON SOCKET FOR CASTERS OR THE LIKE

William H. Noelting, Evansville, Ind., assignor to Faultless Caster Corporation, Evansville, Ind., a corporation Application August 7, 1937, Serial No. 157,898

13 Claims. (Cl. 16—43)

This invention relates to a drive-on socket for angle iron legs, although not necessarily restricted to a leg of that specific cross section for the same may be suitably modified to be associated with a U-shaped cross section leg or a standard channeled cross section leg.

The chief object of the invention is to provide a socket and anchorage therefor which is relatively simple in construction, readily mountable upon a leg and which has a reasonably wide adaptability for the accommodation of variations in standard structures or in other words, manufacturing tolerances.

The chief feature of the invention consists in the formation of the socket and its support in not less than three pieces, two of which cooperate together to peripherally envelope, as it were, the interior and exterior surfaces of the leg and which by reason of the cooperative association therebetween suitably support in anchored relation to the leg a pintle socket adjacent the vertex of the angle of said leg.

Other objects and features of the invention will be set forth more fully hereinafter in the following description.

The full nature of the invention will be understood from the accompanying drawing and the following description and claims:

In the drawing, Fig. 1 is a top plan view of the drive-on socket applied to an angle iron leg, the latter being shown in transverse section.

Fig. 2 is an elevational view of a socket mounted on a leg looking toward the interior angle of the leg.

Fig. 3 is a bottom plan view of the invention applied to an angle iron leg.

Fig. 4 is a perspective view of a modified form of socket retainer.

Fig. 5 is a similar view of a further modified form thereof.

Fig. 6 is a bottom plan view of a modified form of the invention.

Fig. 7 is a front elevational view of a further form of the invention.

In Figs. 1 to 3 of the drawing, there is illustrated one of the all inclusive embodiments of the invention. By the aforesaid is meant that there is illustrated a form of the invention which incorporates many features, as will be hereinafter pointed out in detail, which may be modified or eliminated to produce simpler forms or the simplest form of the invention.

In the drawing, 10 indicates an angle iron leg having the two outside faces 11, the two inner faces 12 substantially parallel to the outer faces 11, and the two side edges 13 therebetween. A strap member, as it were, includes the two portions 14 united at 15 substantially conforming to and bearing upon the exterior surfaces 11—11 of the angle iron leg. Each portion 14 opposite the junction 15 includes the lateral extension 16 which may bear against the side edges 13 of the angle iron leg or may be spaced therefrom, Figs. 1 and 3 illustrating a slight spacing and thus this member is adapted to be mounted upon an angle iron leg, the variations of which, within the range of manufacturing tolerances, is within the accommodation herein provided.

Each lateral portion 16 of the member 14 has an inwardly directed end 17. These ends extend inwardly toward the vertex of the angle iron and are positioned in slightly spaced relation to the interior surface thereof. The portions 16 and 17 have a slight degree of accommodation, as will be hereinafter pointed out.

Reference will now be had to the tubular socket member which is illustrated in a conventional manner and as of a conventional type. The socket member includes the tubular portion 18, a top bearing portion 19 at the upper end and an outwardly and laterally directed flange portion 20 at the lower and open end. As shown herein, the socket is formed in one piece and includes the median seams 21. The socket, therefore, is of the top bearing type and is adapted to receive a pintle which preferably carries a spring ring or friction retainer for yieldingly retaining the pintle in the socket. The pintle may support a caster or a slide. The socket while shown herein as of closed or top bearing type, may be of the open bearing type and for the purpose of this invention, the disclosure only contemplates as an essential part, a socket having a tubular portion, whether of open or closed end type and the lower laterally directed flange at the lower end of the socket.

Since sockets of either character and corresponding pintles associated therewith are old and well known in the art to which the present invention applies, the specific disclosure is herein made merely by way of illustration and not by way of limitation.

The connector between the angular strap member first mentioned and the socket, includes a socket gripping portion 22 which envelopes said socket, although not completely but to a more or less degree, as desired or required. The space between the two ends of this enveloping portion is indicated by the numeral 23 and is in alignment with or immediately adjacent the vertex of the interior angle of the leg.

Each adjacent end of the portion 22 is turned back upon itself as at 24 and extends outwardly as at 25 providing a pair of diverging wing portions. These wing portions may bear against the exterior of the portion 22 or may be spaced therefrom, as desired or required. Herein the same are shown substantially in contact.

In the event the opening 23 is of considerable amount, in these forms of the invention the wings do not contact the portion 22. It is, of course, to be understood that for socket retention that the socket clamping portion 22 must encompass at least 180° of the socket and preferably such envelopement is at least 270° and that shown in the drawing is approximately 340°. These angular limits naturally offer a wide variation so that should the sockets have considerable commercial variation, the connecting member will readily accommodate anyone of the same.

The method of mounting the several elements previously described is as follows:—

The angular member 14—16—17 is slipped on the lower end of the angle iron leg. The two wing portions 25 are then seated between the angle iron leg inner surfaces 12 and the adjacent inner faces of the inward extensions 17. The tubular socket is then inserted in the socket clamping portion 22 or may have been previously inserted therein. In the first instance, the socket is then driven upwardly into the connecting member socket clamping portion 22 until the flange 20 engages the lower edge thereof. Continued driving movement then forces the wing portions 25 between the angle iron leg and the inward extension 17 until the connecting member and the angular member are tightly wedged to the leg.

To prevent longitudinal movement of the associated parts upwardly on the angle iron leg, there is provided on the angle member, and more especially the portions 14, two inwardly directed lugs 30 which project inwardly toward each other and are of a length sufficient to substantially underlie the end of the leg and the leg only. This limitation as to lug length is to prevent interference between said lugs and the connecting member when the latter is driven into the angular member for wedging the latter when initially and completely mounted upon the leg. The lugs, as stated, prevent the angular member from moving relative to the leg beyond the lower end thereof and also serve as a locator for said angular member and also transmit part of the leg load to the angular member.

To facilitate ready insertion of the connecting member, the two inwardly directed portions 17 may at their lower ends, be flared inwardly toward each other, as indicated clearly at 31 in the several figures.

As shown in Fig. 3, the diameter of the flange portion of the socket is sufficiently large so that it may rest or bear upon the lugs 30 if the same be employed. If the lugs 30 be not employed, see Fig. 1, then said flange will bear upon the end of the angle iron leg.

Whenever it is desired to insure uniform distribution of the bearing stresses, there may be mounted on the socket a washer 32 and said washer 32 prevents opening or spreading movement of the socket under lateral stress and thereby prevents said stress from being imparted to the socket clamping portion 22 and eliminates the tendency to open the same and release the socket therefrom. This washer furthermore has the function, as stated, of transmitting the load transferred by reason of its contact with the lugs 30 or if they not be used, by reason of its contact with the end of the angle iron leg, to the entire flange portion 20 of the socket.

In certain forms of the invention, therefore, the washer disclosed herein may be omitted. In certain forms of the invention also, the flared portion 31 may be omitted. In certain forms of the invention also, the lugs 30 may be omitted. In certain forms of the invention also, the portion 22 need not necessarily substantially completely encompass the socket. In certain forms of the invention also the wing portions need not contact the socket encompassing portion 22.

In Fig. 4 is illustrated a modified form of socket retainer having the socket nesting portion 122, the diverging wings 125 formed by reversing the ends of portion 122 at 124 forming the gap 123 therebetween. Each wing 125 includes an offset portion 125a extending inwardly into the same from the free edge 125b but spaced from the top and bottom edges of the ring 125. Upon insertion of the socket retainer (with the socket mounted therein), between the leg 10 and the inturned ends 17 of the strap 15, the offset portions accommodate or compensate for manufacturing tolerance variations in the leg and strap so that a relatively rigid wedging anchorage action or lock is obtained.

In Fig. 5 is illustrated a similar form of socket retainer similarly numbered with numerals of the two hundred series. Edge 225b, however, in this form is inclined so that in addition to wedging transverse to the face of the leg obtained by portion 225a, wedging action parallel thereto is similarly obtained. This insures rigid connection of the strap and socket retainer and additional socket clamping since the wedging action may serve to reduce as much as necessary the gap 223. This so-called "parallel" accommodation is provided to accommodate for variations due to manufacturing tolerance departures permitted.

In Fig. 6 is illustrated a form of the invention bearing similar numerals of the three hundred series. In this form washer 332 has an angular point projecting portion 332a which underlies the central angle portion of the leg 310 and bears directly thereon. In this form the lugs 330 on strap 314 are offset toward the leg edge or from the apex 315 so as to permit such contact. The socket in this form is prevented from longitudinal movement beyond that determined by this contact. The lugs 330 prevent longitudinal movement of the strap along the leg beyond that determined by contact of lugs 330 therewith. The socket holder or retainer is that illustrated in Fig. 5. That shown in Figs. 1 or 4 may be employed, if desired.

In Fig. 7 there is illustrated a semi-concealed form of the invention. Numerals of the four hundred series indicate like parts. In this form the lugs 430 on strap faces 414 instead of being initially dependent in character are initially directed inwardly and are concealed by the portions 414. However, portions of strap faces 414 including the angular portion 415 are recessed at 414a to nest, seat or receive the angular portion 432a on the washer 432 which portion 432a bears directly on the end of the angle iron leg 410.

While the invention has been described in great detail in the foregoing description and has been similarly illustrated in the drawing, the same is by way of example only and is not to be considered restrictive in character. The various modifications of the invention disclosed, as hereinbefore pointed out, as well as others which will readily suggest themselves to persons skilled in this art, are all considered to be within the broad scope of the invention, reference being had to the appended claims.

The invention claimed is:

1. A drive-on socket for angle iron legs including in combination an exteriorly positioned angular member with inturned ends lying in spaced relation to the inner walls of an included angle iron leg, a stem receiving tubular socket having an outwardly directed flange means defining the lower open end thereof, and a wedging and clamping clip including a socket embracing portion for socket clamping and reversely directed wings for wedging insertion between the inturned ends of the angular member and the inner walls of the angle iron legs for locking said member, clip and socket together upon the leg.

2. A device as defined by claim 1, characterized by the inturned ends of said member being flared towards each other at the lowermost portions thereof for facilitating initial wedging reception of the clip.

3. A device as defined by claim 1, characterized by the flange means underlying the socket clamping portion and the wing portions of the clip.

4. A device as defined by claim 1, characterized by the flange means underlying the socket clamping portion and the wing portions of the clip and the leg.

5. A device as defined by claim 1, characterized by the addition of a socket enveloping washer interposed between the flange means and the socket embracing portion, said socket embracing portion being of longitudinal slit tubular character.

6. A device as defined by claim 1, characterized by the addition of a socket enveloping washer interposed between the flange means and the socket embracing portion, said socket embracing portion being of longitudinal slit tubular character and said washer being of sufficient area to overlap the end of the leg.

7. A device as defined by claim 1, characterized by the inturned ends of said angular member being flared towards each other at the lowermost portions thereof for facilitating wedging reception of the clip, and by the addition of inwardly directed lugs upon the angular member for leg end contact and a socket enveloping washer interposed between the flange means and the socket embracing portion, said socket embracing portion being of longitudinal slit tubular character and said washer being of sufficient area to overlap the end of the leg and bear upon said lugs.

8. A device as defined by claim 1, characterized by each wing of the clip including an offset portion for the purpose described.

9. A device as defined by claim 1, characterized by the free edges of the clip being inclined for wedge formation and engagement with the angular member inturned portions adjacent the inturned ends thereof.

10. A device as defined by claim 1, characterized by the free edges of the clip being inclined for wedge formation and engagement with the angular member inturned portions adjacent the inturned ends thereof, and each wing of the clip including an offset portion for the purpose described.

11. A device as defined by claim 1, characterized by the addition of a socket enveloping washer interposed between the flange means and the socket embracing portion, said socket embracing portion being of longitudinal slit character, and said washer being of sufficient area to extend toward and underlie the leg end adjacent the apex thereof.

12. A device as defined by claim 1, characterized by the addition of a socket enveloping washer interposed between the flange means and the socket embracing portion and extending toward and underlying the leg and adjacent the apex thereof, and by the angular member at the lowermost portions having laterally projecting portions underlying the leg end adjacent the washer contact therewith for limiting angular member movement on the leg in socket mounting.

13. A device as defined by claim 1, characterized by the addition of a socket enveloping washer interposed between the flange means and the socket embracing portion and extending toward and underlying the leg and adjacent the apex thereof, and by the angular member at the lowermost portions having laterally projecting portions underlying the leg end adjacent the washer contact therewith for limiting angular member movement on the leg in socket mounting, said angular member at its lowermost portion projecting below the leg end and recessed adjacent the apex thereof for washer nesting and masking said laterally projecting portions underlying the leg end.

WILLIAM H. NOELTING.